United States Patent

[11] 3,610,757

[72] Inventors Alvin Van Valkenburg
 McLean;
 Ellis R. Lippincott, Vienna, Va.; Charles E.
 Weir, Bethesda, Md.
[21] Appl. No. 757,716
[22] Filed Sept. 5, 1968
[23] Continuation-in-part of Ser. No. 720,866,
 Apr. 12, 1968
[45] Patented Oct. 5, 1971
[73] Assignee High Pressure Diamond Optics, Inc.
 McLean, Va.

[54] HIGH PRESSURE OPTICAL CELL FOR RAMAN SPECTROGRAPHY
 2 Claims, 5 Drawing Figs.

[52] U.S. Cl. .................................................. 356/36,
 250/218, 356/75, 356/103, 356/207, 356/244, 356/246
[51] Int. Cl. .................................................. G01n 1/00,
 G01j 3/44, G01n 21/16
[50] Field of Search ........................................ 356/36, 75,
 102–104, 208, 244, 246, 207; 250/218; 331/94.5

[56] References Cited
 UNITED STATES PATENTS
 3,079,505  2/1963  Weir et al. ..................... 356/244 X
 3,446,558  5/1969  Seaton ........................... 331/94.5 X
 3,445,167  5/1969  Armstrong et al. ............. 331/94.5 X OTHER REFERENCES
 Masers & Lasers, Hogg et al., 1962 pp. 134– 135.
 Damen et al., Phy. Rev. Letters, v. 14, N. 1, pp. 9– 11 (1-4-65).
 Gordon et al., J. Appl. Physics, v. 36, N. 1, pp. 3– 8 (1-65).
 Leite et al., Appl. Phys. Letters, v. 5, N. 7, pp. 141– 143 (10-64)
 Leite & Porto, J.O.S.A., v. 54, N. 8, pp. 981– 983 (8-64).
 Damon & Tomlinson, Appl. Optics, v. 2, N. 5, pp. 546– 547 (5-63).

Primary Examiner—Ronald L. Wibert
Assistant Examiner—Warren A. Sklar
Attorneys—A. Yates Dowell and A. Yates Dowell, Jr.

ABSTRACT: A high pressure optical cell is combined with a laser beam spectrography and optical means for Raman spectrography at various angles through the specimen.

PATENTED OCT 5 1971

3,610,757

INVENTORS
ALVIN VAN VALKENBURG,
ELLIS R. LIPPINCOTT and
CHARLES E. WEIR
BY
ATTORNEYS

HIGH PRESSURE OPTICAL CELL FOR RAMAN SPECTROGRAPHY

This application is a continuation-in-part of our application filed Apr. 12, 1968, Ser. No. 720,866. The invention relates to analysis of materials under high pressures and particularly to examination of the Raman effect of such materials when they are subjected to high pressure and temperature.

The Raman effect has been described as the scattering of monochromatic light accompanied by a change in wavelength, due to the absorption of energy quanta by the scattering medium. Analysis of materials by observation of the Raman effect has been known for many years. Ordinary light sources required a lengthy time, on the order of hours, to reproduce Raman spectra on film. The present invention includes a laser as a source of radiation combined with a high pressure cell to permit analysis in a relatively brief time of specimens that are subject to high pressure and temperatures.

When light or electromagnetic radiation of a given frequency impinges on a sample of material, three processes can occur: (1) the light may be transmitted unchanged; (2) the light may be absorbed; (3) the light may be randomly scattered in all directions.

If there is no absorption, the scattered light will be of two kinds: (1) most of the scattered light will be of the same frequency as the incident light; (2) a small amount of the scattered light will be of different frequencies from the incident light. The former is known as Rayleigh scattering, and may be considered as perfectly elastic interactions between the radiation and molecules of the material. The latter is called Raman scattering, and results from inelastic interactions between the radiation and molecules of the material. These interactions result in a set of new frequencies, $(V_o+V_k)$ and $(V_o-V_k)$, where $V_o$ is the frequency of the incident light. This set of new frequencies is called the Raman spectrum: it may consist of only one or two bands or of very many bands, depending on the composition of the sample.

The Raman spectrum is a specific characteristic of a given composition; it is determined by the kinds of atoms comprising the composition, their spatial arrangement throughout the composition, and the nature of chemical bonds linking the various atoms together. Such a specific molecular property is affected by both intermolecular and intramolecular interactions. Phase changes (e.g. liquid to solid, or from one polymorphic solid to another polymorphic solid) are indicated or reflected by changes in Raman spectra. So also are changes in interatomic distances (e.g., chemical bond lengths and bond angles). Raman spectra are particularly indicative or sensitive to changes from composition to compound (e.g., components of a composition react together to form a compound).

The frequencies of the Raman spectrum of a particular sample is independent of the frequency of the incident radiation, called the exciting line. However, the intensity of the Raman spectrum is a function of the fourth power of the frequency of the exciting line. Thus the most desirable exciting line would be the highest frequency not absorbed by the sample. Recent innovations in laser technology have provided high intensity light sources with a wide choice of frequencies available.

These and other objects of the invention will become apparent from the following description in conjunction with the accompanying drawings in which.

SUMMARY OF THE INVENTION

Figure 1:
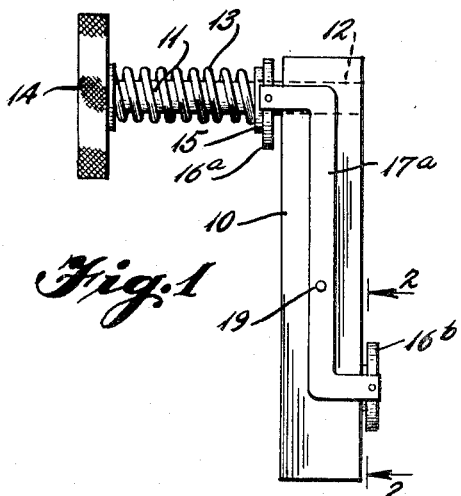
FIG. 1 is an elevation of a high-pressure optical cell of the type used in the invention.
Figure 2:
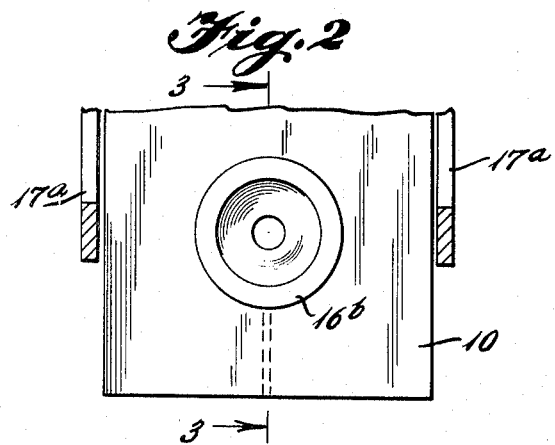
FIG. 2 is an enlarged section on the line 2—2 of FIG. 1.

Experimental difficulties encountered in Raman spectroscopy with a high-pressure cell are more severe than in normal sampling procedures. The sample is small, and the efficiency of collecting the scattered radiation is low due to restricted apertures in the cell. Nevertheless, proper technique has resulted in obtaining Raman spectra of samples in the cell which are comparable to spectra obtained with conventional techniques.

In practice, the exciting beam from the laser is impinged on the sample in the high-pressure cell. The scattered radiation at either 0°, 90°, or 180° from the angle of incidence is collected by suitable means and directed into a conventional spectrometer which detects and records the frequency distribution of the scattered radiation. Information on the sample is obtained from this spectral data.

With further reference to the drawings, the high-pressure optical cell is generally like that described in Pat. No 3,079,505 and our application Ser. No. 720,866. The temperature modification means of that application may be employed in the present invention if desired. In such a cell, materials may be analyzed in the spectral region of 1–4 $\mu$ and from 5.2 $\mu$ to beyond 30 $\mu$ under calculated pressures between 1 atmosphere and 160,000 atmospheres.

The cell includes a main body 10 which receives a threaded spindle 11 within a tapped bore 12. A calibrated spring 13 which is concentric about the spindle 11 abuts a head 14 of the spindle at one end and a collar 15 at its other. The collar abuts an upper thrust plate 16a through which the spindle passes. A lower thrust plate 16b is connected by arm 17a to the thrust plate 16a. The arm 17a is pivotally mounted on pin 19 whereby rotation of the spindle in one direction tends to move the thrust plate downwardly causing the thrust plate 16b to move upwardly. The thrust plate 16b bears against a first diamond holder 20a for diamond 24a, which is received within the holder 10.

At the remote end of the body 20 is a portion of reduced diameter 30 which provides a collar for retaining the second diamond holder 20b. Within the holder 20b, diamond 24b is mounted.

The specimen is placed between the opposing faces of the diamonds and may be held within a gasket 31, if necessary, as where liquids are examined.

Figure 3:
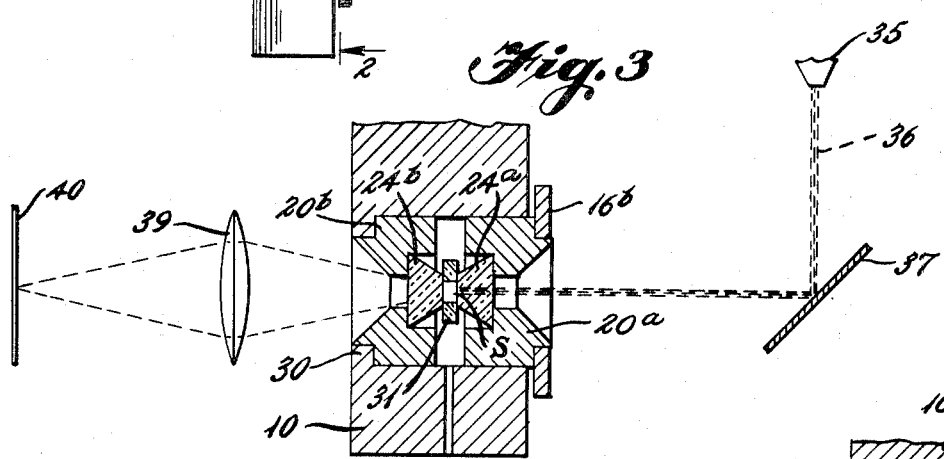
FIG. 3 is a section on the line 3—3 of FIG. 2 with a laser source and collection means indicated diagrammatically.

In order that the effects of pressure and temperatures may be studied by analysis of the Raman spectra, a laser source is provided at 35 which directs a narrow ray or beam 36 against a reflector 37 which directs it through specimen S. As indicated in FIG. 3, some scattering of the radiation occurs and in FIG. 3 this is indicated as collected by lens 39 which directs the resulting beam onto screen 40 where it may be examined by a spectrograph or the like. Such beam may also cause a material increase in temperature of the specimen.

Figure 4:
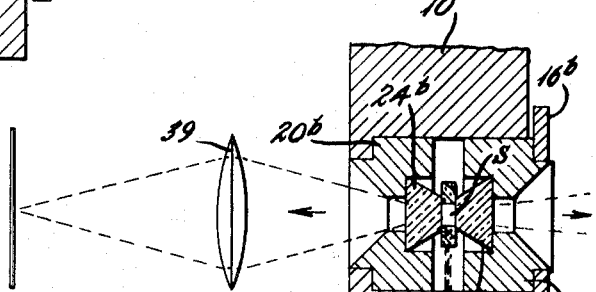
FIG. 4 is a section similar to FIG. 3 in which the collecting lens is arranged at substantially right angles to the source of laser beam impinging on the specimen.

In FIG. 4, reflector 37 is arranged to direct the laser beam through an opening 41 in the holder which is substantially perpendicular to the axis of the collecting lens 39.

Figure 5:
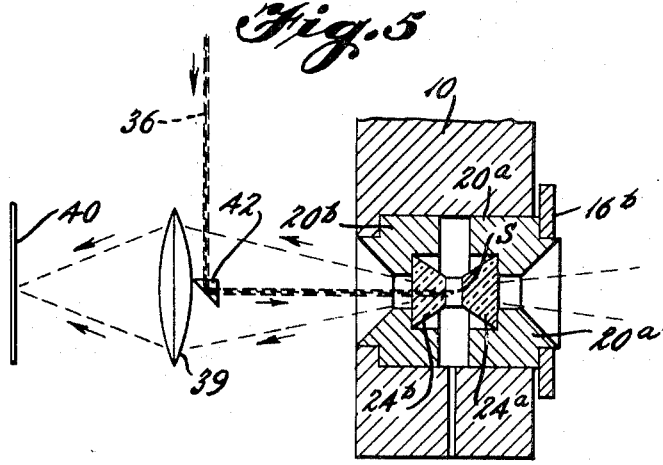
FIG. 5 is a section similar to FIGS. 3 and 4 in which the collecting lens is arranged at 180° to the laser beam.

In FIG. 5, a reflector 42 is employed which is substantially along the axis of the lens 39 and on the same side of the specimen in order that the lens may collect rays at 180° from the incident beam.

What is claimed is:

1. A high-pressure optical cell in which a sample material is to be tested for Raman spectrography under conditions of high pressure, said cell having a body with a bore extending inwardly from one surface of said body and a concentric counterbore extending inwardly from an opposite surface of said body, a pair of holders disposed in said counterbore, each of said holders supporting a generally transparent pressure-applying means substantially axially of said counterbore, said pressure-applying means facing each other and spaced apart a distance sufficient to receive the sample of material being tested, force-applying means for moving one of said holders toward the other to apply pressure through said generally transparent pressure-applying means to the sample of material being tested; the improvement comprising a second opening in said body, said second opening having an axis at an angle to the axis of said counterbore and so aligned as to intersect said sample of material, a monochromatic spectrography system including a monochromatic light unit, means for directing a monochromatic beam of light from said unit through said second opening onto said sample of material while the material is under pressure, and lens means located adjacent to said cell and generally axially of said counterbore for collecting and concentrating scattered radiations so that the material can be analyzed by Raman spectrography.

2. The structure of claim 1 including a transparent gasket surrounding the sample of material between said pressure-applying means.